United States Patent
Ofori-Boadu et al.

(10) Patent No.: US 11,104,611 B2
(45) Date of Patent: Aug. 31, 2021

(54) SWINE-WASTE BIOCHAR AS A SUSTAINABLE CEMENT REPLACEMENT MATERIAL

(71) Applicant: North Carolina Agricultural and Technical State University, Greensboro, NC (US)

(72) Inventors: Andrea Ofori-Boadu, Greensboro, NC (US); Elham H. Fini, Greensboro, NC (US)

(73) Assignee: North Carolina Agricultural and Technical State University, Greensboro, NC (US)

( * ) Notice: Subject to any disclaimer, the term of this patent is extended or adjusted under 35 U.S.C. 154(b) by 183 days.

(21) Appl. No.: 16/410,643

(22) Filed: May 13, 2019

(65) Prior Publication Data
US 2019/0345061 A1    Nov. 14, 2019

Related U.S. Application Data

(60) Provisional application No. 62/670,381, filed on May 11, 2018.

(51) Int. Cl.
| | | |
|---|---|---|
| *C04B 18/10* | (2006.01) | |
| *C04B 28/04* | (2006.01) | |
| *C04B 40/00* | (2006.01) | |
| *C04B 14/06* | (2006.01) | |
| *C04B 103/30* | (2006.01) | |
| *C04B 103/12* | (2006.01) | |

(52) U.S. Cl.
CPC .............. *C04B 18/10* (2013.01); *C04B 14/06* (2013.01); *C04B 28/04* (2013.01); *C04B 40/0042* (2013.01); *C04B 2103/12* (2013.01); *C04B 2103/302* (2013.01)

(58) Field of Classification Search
CPC ..... C04B 14/06; C04B 18/10; C04B 20/0076; C04B 28/02; C04B 28/04; C04B 40/0042; C04B 2103/12; C04B 2103/302; C04B 2111/27; Y02W 30/91
See application file for complete search history.

(56) References Cited

U.S. PATENT DOCUMENTS

| | | | |
|---|---|---|---|
| 8,641,818 B2 * | 2/2014 | Roddy | .................... C04B 28/02 |
| | | | 106/705 |
| 9,481,793 B2 | 11/2016 | Huang et al. | |
| 9,637,615 B2 | 5/2017 | Fini | |
| 10,077,356 B2 | 9/2018 | Fini | |
| 2019/0112454 A1 | 4/2019 | Fini | |
| 2019/0233638 A1 | 8/2019 | Zhang et al. | |

OTHER PUBLICATIONS

Sahin et al "Replacing Cattle Manure Ash as Cement into Concrete", Journal of Applied Sciences 6 (13), pp. 2840-2842. (Year: 2006).*
Fini et al., "Chemical characterization of biobinder from swine manure: sustainable modifier for asphalt binder." Journal of Materials in Civil Engineering, 23(11), 2011, 1506-1513.
Walters et al., "Enhancing asphalt rheological behavior and aging susceptibility using bio-char and nano-clay," Am. J. Eng. Appl. Sci, 7(1), pp. 66-76 (2014).
Walters et al. "Investigating biochar as flow modifier and water treatment agent for sustainable pavement design," American Journal of Engineering and Applied Sciences. 8(1), 2015, 138-146 (2015).
Akhtar, A. and Sarmah, A.K., "Novel biochar-concrete composites: Manufacturing, characterization and evaluation of the mechanical properties," Science of the total environment, 616, pp. 408-416 (2018).
Choi et al., "Mechanical properties of mortar containing bio-char from pyrolysis," Journal of the Korea Institute for structural maintenance and inspection. 16(3), pp. 67-74 (2012).
Gupta, S. and Kua, H.W., "Factors determining the potential of biochar as a carbon capturing and sequestering construction material: critical review," Journal of Materials in Civil Engineering, 29(9), p. 04017086 (2017).
Laili et al., "Evaluation of the compressive strength of cement-spent resins matrix mixed with biochar," Malaysian Journal of Analytical Sciences, 19(3), pp. 565-573 (2015).
Restuccia, L. and Ferro, G.A., "Promising low cost carbon-based materials to improve strength and toughness in cement composites" Construction and building materials, 126, pp. 1034-1043 (2016).
Schmidt, H. J. (2008). The Use of Biochar as a Building Material-Cities as Carbon Sinks. ithaka-journal.net. 2013. Retrieved on Mar. 18, 2021 from http://www.ithakajournal.net/pflanzenkohle-zum-hauserbauen-stadte-als-kohlenstoffsenken?lang=en.
Shahbazi et al., "Properties of Biochar from Anaerobically Digested Food Waste and Its Potential Use in Phosphorus Recovery and Soil Amendment," Sustainability, 10(12), p. 4692. (2018).

* cited by examiner

*Primary Examiner* — Anthony J Green
(74) *Attorney, Agent, or Firm* — Jenkins, Wilson, Taylor & Hunt, P.A.

(57) ABSTRACT

The presently application relates generally a composition comprising swine waste biochar and cement and methods of making same.

17 Claims, 10 Drawing Sheets

SWINE-WASTE BIOCHAR AS A SUSTAINABLE CEMENT REPLACEMENT MATERIAL

RELATED APPLICATIONS

The presently disclosed subject matter claims the benefit of U.S. Provisional Patent Application Ser. No. 62/670,381 filed May 11, 2018; the disclosure of which is incorporated herein by reference in its entirety.

STATEMENT AS TO RIGHTS TO INVENTIONS MADE UNDER FEDERALLY SPONSORED RESEARCH OR DEVELOPMENT

This invention was made with government support under Grant Number 1546921 awarded by the National Science Foundation. The government has certain rights in the invention.

TECHNICAL FIELD

The presently disclosed subject matter generally relates to use of swine waste biochar as a replacement of cement pastes in the manufacture of concrete.

BACKGROUND

The hydration and setting behavior of fresh cement pastes, particularly cement pastes modified with partial cement replacement materials (PCRM), are critical in the development of sustainable structural concrete. The hydration of cement is a complex phenomenon that occurs when water is added to cement. Through dispersion, dissolution, agglomeration, and chemical reactions, the cement pastes transition from a fluid state to a solid state. During early-age hydration of Ordinary Portland Cement (OPC), its four major phases (Tricalcium Silicate, Dicalcium Silicates, Tricalcium Aluminates, and Tetracalcium Aluminoferrites) move and react with water to form cement paste. Cement paste is a multi-phase product of cement and water. The chemical changes that take place during cement paste hydration often affect the progressive setting of the paste, wherein there is a change from an initial semifluid mixture to a solid composite. With the pursuit of more sustainable PCRM, the setting and hydration behavior of PCRM modified cement paste system are of interest.

Biochar is a carbon-rich substance typically produced via pyrolysis, a thermochemical process used at elevated temperatures in the absence of oxygen. Swine waste biochar (SB) is isolated after thermochemical liquefaction of swine waste as disclosed herein. Swine waste biochar is a black solid residue comprising a porous network of carbonates and/or aromatic carbon, as well as minerals, including calcium and silica.

Water absorption is increasingly used to quantify the durability of cementitious systems. Concrete is only partly saturated and so the initial absorption of water and salts is at least in part by capillary action and is heavily influenced by concrete pore volumes and pore connectivity. Concrete with high water absorption is susceptible to freezing and thawing, as water enters in the cement paste, and even in the aggregates. High water absorption also facilitates the ingress of contaminative substances, which can lead to concrete deterioration.

SUMMARY

The presently disclosed subject matter provides, in one aspect, a cementitious composition comprising swine waste biochar and cement. The presently disclosed subject matter provides, in another aspect, a composition comprising about 1 part by weight cementitious materials, about 1 to about 3 parts by weight fine aggregate, about 1 to about 5 parts by weight coarse aggregate, and about 0.2 to about 0.6 parts by weight water, wherein the cementitious materials comprise from about 0.25% to about 30% by weight swine waste biochar and about 99.75% to about 70% by weight cement.

The presently disclosed subject matter provides, in another aspect, a method of accelerating the setting of a cement paste comprising combining cement with swine waste biochar to obtain a blended mix before the addition of water. The presently disclosed subject matter provides, in another aspect, a reducing the water absorption of a cement paste comprising combining cement with swine waste biochar to obtain a blended mix before the addition of water.

Accordingly, it is an object of the presently disclosed subject matter to provide a cementitious composition comprising swine waste biochar and cement.

An object of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

It will be understood that the drawings are for the purpose of describing embodiments of the inventions and are not intended to limit the inventions thereto.

DETAILED DESCRIPTION

Figure 2A:
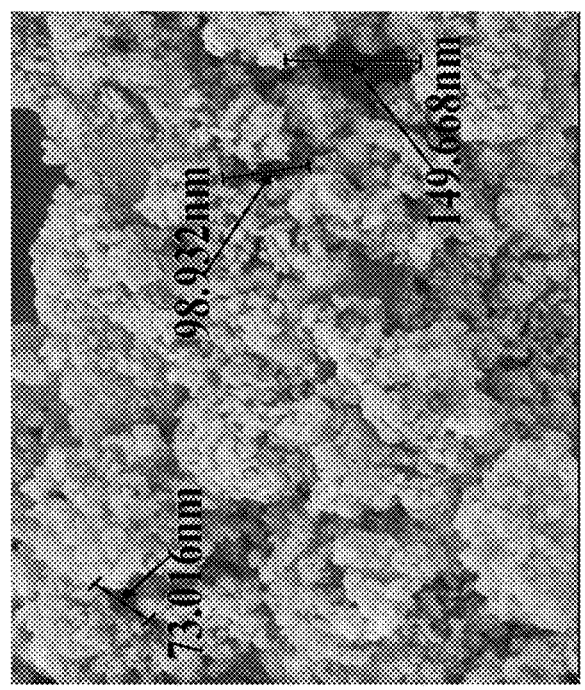
FIG. 2A is an SEM image of SB clusters at 30,000× magnification.

This description is not intended to be a detailed catalogue of all the ways in which the present invention may be implemented or of all the features that may be added to the present invention. For example, features illustrated with respect to one embodiment may be incorporated into other embodiments, and features illustrated with respect to a particular embodiment may be deleted from that embodiment. Thus, one or more of the method steps included in a particular method described herein may, in other embodiments, be omitted and/or performed independently. In addition, numerous variations and additions to the embodiments suggested herein, which do not depart from the instant invention, will be apparent to those skilled in the art in light of the instant disclosure. Hence, the following description is intended to illustrate some particular embodiments of the invention, and not to exhaustively specify all permutations, combinations and variations thereof. It should therefore be appreciated that the present invention is not limited to the particular embodiments set forth herein. Rather, these particular embodiments are provided so that this disclosure will more clearly convey the full scope of the invention to those skilled in the art.

The terminology used herein is for the purpose of describing particular embodiments of the present invention only and is not intended to limit the present invention. Although the following terms are believed to be well understood by one of skill in the art, the following definitions are set forth to facilitate understanding of the presently disclosed subject matter.

All references listed herein, including but not limited to all patents, patent applications and publications thereof, and scientific journal articles, are incorporated herein by reference in their entireties to the extent that they supplement, explain, provide a background for, or teach methodology, techniques, and/or compositions employed herein.

I. Definitions

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long-standing patent law convention, the terms "a", "an", and "the" refer to "one or more" when used in this application, including the claims.

The term "and/or" when used in describing two or more items or conditions, refers to situations where all named items or conditions are present or applicable, or to situations wherein only one (or less than all) of the items or conditions is present or applicable.

The use of the term "or" in the claims is used to mean "and/or" unless explicitly indicated to refer to alternatives only or the alternatives are mutually exclusive, although the disclosure supports a definition that refers to only alternatives and "and/or."

As used herein "another" can mean at least a second or more.

The term "comprising", which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used in the specification, the presently disclosed subject matter can include the use of either of the other two terms.

Unless otherwise indicated, all numbers expressing quantities of size, capacity, percentage (%), and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about", when referring to a value is meant to encompass variations of in one example ±20% or ±10%, in another example ±5%, in another example ±1%, and in still another example ±0.1% from the specified amount, as such variations are appropriate to perform the disclosed methods.

As used herein, "swine waste biochar" ('SB') refers to the biochar obtained from a thermochemical processing of swine waste as disclosed herein.

In one embodiment, SB is mechanically milled before incorporation into cement and/or cement paste. In another embodiment, SB particles undergo alkali treatment using sodium hydroxide, potassium hydroxide, and/or ammonia solutions.

As used herein, "cement" refers to Portland cement, which is typically prepared by sintering a mixture of components including calcium carbonate (as limestone), aluminum silicate (as clay or shale), silicon dioxide (as sand), and miscellaneous iron oxides. The term "Portland cement" includes all cementitious compositions which meet the requirements of the ASTM (as designated by ASTM Specification C150), including but not limited to Type I, type IA, type II, type IIA, type III, type IIIA, type IV, and type V. Portland cement can include mixtures of such Types as well.

As used herein, "cementitious materials" refers to the portion of a hardenable mixture that provides for binding or uniting the other materials present in the mixture, and thus includes cement, optionally in combination with swine waste biochar or other additives. In some embodiments, swine waste biochar comprises from about 0.25% to about 70% by weight of the cementitious materials, or about 0.5% to about 60% by weight. In some embodiments, swine waste biochar comprises from about 0.5% to about 50% by weight of the cementitious materials, or about 1% to about 40% by weight. In some embodiments, swine waste biochar comprises from about 1.25% to about 30% by weight of the cementitious materials. In some embodiments, swine waste biochar comprises from about 2.5% to about 15% by weight; in some embodiments, swine waste biochar comprises from about 5% to about 12.5% of the cementitious materials; in other embodiments, from about 7.5% to about 10% of the cementitious materials. In one embodiment, the balance of cementitious materials is cement, such as, for example, Portland cement, or Type I/Type IA. In another embodiment, the balance of cementitious materials is cement and another additive, such as for example, fly ash, plant-based biochar, or other additives known to those of skill in the art.

In one embodiment, swine waste biochar comprises no more than about 70% by weight of the cementitious materials, no more than about 60% by weight, no more than about 50% by weight, or no more than about 40% by weight. In another embodiment, swine waste biochar comprises no more than about 30% by weight of the cementitious materials. In one embodiment, swine waste biochar comprises no more than about 20% by weight of the cementitious materials, or no more than about 10%, or no more than about 5%. In one embodiment, the balance of cementitious materials is cement, such as, for example, Portland cement. In another embodiment, the balance of cementitious materials is cement and another additive.

In one embodiment, swine waste biochar comprises about 1.25% by weight of the cementitious materials and cement comprises the balance. In another embodiment, swine waste biochar comprises about 2.5% by weight of the cementitious materials, about 5%, about 7.5%, about 10%, about 12.5%, about 15%, about 20%, about 30%, about 40%, about 50%, about 60%, or about 70%. In one embodiment, the balance of cementitious materials is cement, such as, for example, Portland cement. In another embodiment, the balance of cementitious materials is cement and another additive.

As used herein "cement paste" refers to a composition comprising cement and water. Cement paste is a multi-phase product of cement and water, having a complex structure, composition, and morphology, each of which varies with time. Cement pastes typically comprise calcium hydroxide crystals, aluminates, and unreacted cement particles which are all embedded in a matrix of amorphous nanostructured hydration product referred to as calcium-silicate-hydrate (C-S-H) gel.

When the cementitious materials comprise both cement and swine waste biochar, the paste is designated herein as: SBx, CP-SBx, CPx, or CPx-Y where x is the weight percent of SB present in the mix and Y is the treatment temperature of SB, where applicable.

As used herein "concrete" refers to a hardenable mixture comprising cementitious materials; a fine aggregate, such as sand: a coarse aggregate, such as but not limited to crushed basalt coarse aggregate; and water.

The presently disclosed subject matter provides, in one aspect, a cementitious composition comprising swine waste biochar and cement. In one embodiment, swine waste biochar comprises between about 0.25% and about 30% by weight of the composition. In another embodiment, the swine waste biochar comprises between about 1% and about 15% by weight of the composition. In yet another embodiment, the swine waste biochar comprises about 40%-60% carbon, about 25%-45% oxygen, about 2%-11% phosphorus and about 2%-10% calcium. In yet another embodiment, the swine waste biochar comprises about 50-60% carbon and about 25%-35% oxygen, or the swine waste biochar comprises about 55% carbon, about 30% oxygen, about 5% phosphorus and about 5% calcium.

The presently disclosed subject matter provides, in another aspect, a composition comprising about 1 part by weight cementitious materials, about 1 to about 3 parts by weight fine aggregate, about 1 to about 5 parts by weight coarse aggregate, and about 0.2 to about 0.6 parts by weight water, wherein the cementitious materials comprise about 0.25% to about 40% by weight swine waste biochar and about 99.75% to about 60% by weight cement. In another embodiment, the cementitious materials comprise about 0.25% to about 30% by weight swine waste biochar and about 99.75% to about 70% by weight cement or the cementitious materials comprise about 1% to about 30% by weight swine waste biochar and about 99% to about 70% by weight cement. In one embodiment, the swine waste biochar comprises about 40%-60% carbon, about 25%-45% oxygen, about 2%-11% phosphorus and about 2%-10% calcium. In another embodiment, the swine waste biochar comprises about 50-60% carbon and about 25%-35% oxygen, or the swine waste biochar comprises about 55% carbon, about 30% oxygen, about 5% phosphorus and about 5% calcium.

In one variation of any aspect or embodiment, the fine aggregate is sand and the coarse aggregate is stone.

In another embodiment, the cementitious materials comprise about 1% to about 15% by weight swine waste biochar and about 99% to about 85% by weight cement. In yet another embodiment, the swine waste biochar comprises about 40%-60% carbon, about 25%-45% oxygen, about 2%-11% phosphorus and about 2%-10% calcium. In another embodiment, the swine waste biochar comprises about 50-60% carbon and about 25%-35% oxygen, or the swine waste biochar comprises about 55% carbon, about 30% oxygen, about 5% phosphorus and about 5% calcium. In one variation of any aspect or embodiment, the fine aggregate is sand and the coarse aggregate is stone.

The presently disclosed subject matter provides, in another aspect, a method of accelerating the setting of a cement paste comprising combining cement with swine waste biochar to obtain a blended mix before the addition of water. In one embodiment, the cement paste containing swine waste biochar has a shorter initial time of setting and/or a shorter final time of setting compared to cement paste that does not contain swine waste biochar.

The presently disclosed subject matter provides, in another aspect, a reducing the water absorption of a cement paste comprising combining cement with swine waste biochar to obtain a blended mix before the addition of water. In one embodiment, the water absorption is reduced by at least about 60% compared to water absorption of cement paste that does not contain swine waste biochar. In another embodiment, water absorption is reduced by at least about 70%, or at least about 80% compared to cement paste that does not contain swine waste biochar.

As shown herein, swine-waste biochar ('SB') has a direct effect on the hydration and setting behavior of cement pastes. SB is not an inert material in cement pastes, but instead accelerates polymerization as a result of hydration reactions. As shown herein, when mixing water was added to the dry cement/SB binder mix, chemical reactions occurred between the calcium silicates of ordinary Portland cement and the carboxylic surface functional groups of SB; calcium-silicate-hydrate, calcium-aluminate-sulfate-hydrate, calcium hydroxide, as well as calcium-carboxylate-salts (C-C-S) were observed in SB modified pastes before C-S-H in the FTIR spectra. In particular, the porous and negatively-charged carbonaceous surfaces of SB resulted in its adsorption of capillary water and reduced the flow of the swine-waste biochar modified cement pastes. With the addition of water to the dry swine-waste biochar/cement binder mix, chemical reactions between carboxylate anions from swine-waste biochar and calcium cations from Portland cement resulted in the development of Calcium-Polycarboxylate-Salts, which reduced the initial setting times of cement pastes modified with swine-waste biochar. Based on the dilution effect of the partial replacement of Portland cement with SB, the flow and setting of cement pastes are improved.

As early as 15 minutes after water was added to the dry binder mix of ordinary Portland cement with a 20% SB replacement by mass, C-C-S was observed and appears to accelerate setting of the cement pastes-chemical reactions between the calcium cations from Portland cement and carboxylate anions from SB can lead to the development of C-C-S, which can provide additional nucleation sites, accelerating the development of commonly observed calcium-silicate-hydrates (C-S-H). The spectroscopic shift for polymerizing silica for C-S-H was observed 270 minutes after the addition of water to the dry cement/SB binder mix for cement pastes with 20% SB;

The shorter initial and final times of setting obtained for SB modified cement pastes correlated with the early observation of C-C-S in the FTIR spectra, suggesting that C-C-S accelerated the setting and development of cement pastes modified with SB. Furthermore, SB in cement pastes contributed seeding sites to support the growth of hydrated products. In one embodiment, an SB replacement percentage of 15% at a 0.28 water/binder ratio showed a good setting time.

As shown herein, SB can be used as a partial cement replacement material. Without being bound by theory, carboxylate anions in SB react with calcium cations from Portland cement to form Calcium-Polycarboxylate-Salts (C-P-S), alongside the typical Calcium-Silicate-Hydrate (C-S-H) and Calcium Hydroxide (CH) from Portland cement hydration. These concurrent reactions accelerate the setting of SB modified cement paste and improve water penetration resistance.

In some embodiments the SB-modified cement has a reduced surface hardness.

EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter.

Example 1

Experimental Materials and Methods

Type 1/1A normal Portland cement (specific gravity of 3.15 and a pH between 12 and 13) as specified by the American Society for Testing Materials (ASTM C-150) was purchased from Home Depot (Cobb County, Ga., U.S.). Potable water was obtained from a faucet in the Soils Laboratory at North Carolina Agricultural & Technical State University.

Swine-waste biochar (SB), a black carbon-rich powdery substance, was obtained from a thermochemical process as disclosed in Fini, E. H., Kalberer, E. W., Shahbazi, A., Basti, M., You, Z., Ozer, H., and Aurangzeb, A. "Chemical characterization of biobinder from swine manure: sustainable modifier for asphalt binder." Journal of Materials in Civil Engineering, 23(11), 2011, 1506-1513.

In particular, about 1 gallon of swine manure slurry (typically about 80%-95% liquid by weight), was charged in a 1.5 gallon autoclave. Nitrogen gas was used to purge the reactor three times. The purged reactor was then heated over the course of ~2.5 hours to a setting temperature of 340° C., and the pressure of raised to a reaction pressure of 10.3 MPa. The reaction was completed in about 15 minutes. The reactor was then cooled to room temperature using a recycled ice-water cooling coil over the course of at least about 2 hours. After cooling, the by-product gas was released from the autoclave, returning the reactor to atmospheric pressure.

The reaction mixture, including bio-oil, solid and aqueous phases, was vacuum filtered. The filtrate, typically referred to as black water, was isolated. The sticky residue was then rinsed once with 10-50% solvent (either acetone or a 30:70 acetone/toluene mixture) and vacuum filtered. The fine solid residue in the filter was isolated as bio-char Table 1 shows the mix design for the cement pastes used in this Example.

TABLE 1

Mix Design

| Mix Design | Cement (%) | SB (%) | Water/Binder Ratio |
|---|---|---|---|
| SB0.00 | 100.00 | 0.00 | 0.28 |
| SB1.25 | 98.75 | 1.25 | 0.28 |
| SB2.50 | 97.50 | 2.50 | 0.28 |
| SB5.00 | 95.00 | 5.00 | 0.28 |
| SB10.00 | 90.00 | 10.00 | 0.28 |

Following the mix design for the different specimen listed in Table 1, the components (SB, cement, and water) were weighed. SB was manually dry mixed with cement until a uniform binder mix was obtained. Mixing overcame the cohesive interparticle van der Waals' forces present in SB clusters. Electrostatic interactions between SB and cement enhanced SB adsorption to the particle surfaces of cement, thereby creating a more uniform mix. The dry mixing process reduced the agglomeration of SB, enhanced its dispersion in cement powders, and improved the uniformity of the dry binder mix. After the dry binder mixing, the ASTM wet mechanical mixing process (ASTM C305-14) for cement pastes was followed (ASTM C305-14, Standard Practice for Mechanical Mixing of Hydraulic Cement Pastes and Mortars of Plastic Consistency. ASTM International, West Conshohocken, Pa. 2015, found at www.astm.org.)

The ASTM C1437 standard test for the flow of hydraulic cements assessed the impact of SB on the flow of cement pastes (ASTM C1437-15, Standard Test Method for Flow of Hydraulic Cement Mortar. ASTM International, West Conshohocken, Pa. 2015, found at www.astm.org.). After placing the specimens on the flow table, the flow table was dropped 25 times. Four different base diameter (d) readings of the spread cement paste specimen were taken at the four lines scribed on the flow table top. The average base diameter ($d_a$) was the sum of the four base diameters (d) divided by 4. The Flow Percent (F) is the resulting increase in the average base diameter (da) of the tamped specimen, expressed as a percentage of the original inside base diameter (D) of the mold (Equation 1).

$$F=(da-D)/D\times100 \quad \text{Equation 1}$$

The ASTM C191 standard test was used to determine the time for setting of the cement paste specimens using the Vicat Needle Method as described in American Standards for Testing Materials (2013a). (ASTM C191-13, Standard Test Methods for Time of Setting of Hydraulic Cement by Vicat Needle, ASTM International, West Conshohocken, Pa., 2013, found at www.astm.org.) The initial setting time was recorded when a 25 mm needle penetration was obtained.

Fourier Transform Infrared (FTIR) spectroscopy at room temperature was used to characterize each of the cement, swine-waste biochar, and cement pastes, using a Varian 670 FTIR Spectrometer (4000 $cm^{-1}$ to 500 $cm^{-1}$). Scanning Electron Microscopy (SEM) was used to examine the microstructure of specimens using a Carl Zeiss Auriga SEM-FIB Crossbeam Workstation. The specimens were placed on carbon conductive tabs on stub mounts, and then positioned in the SEM equipment for imaging. Energy Dispersive Spectroscopy (EDS) analysis was used to provide elemental analysis of the specimens.

Results and Discussion

SEM and EDS of SB

Figure 1:
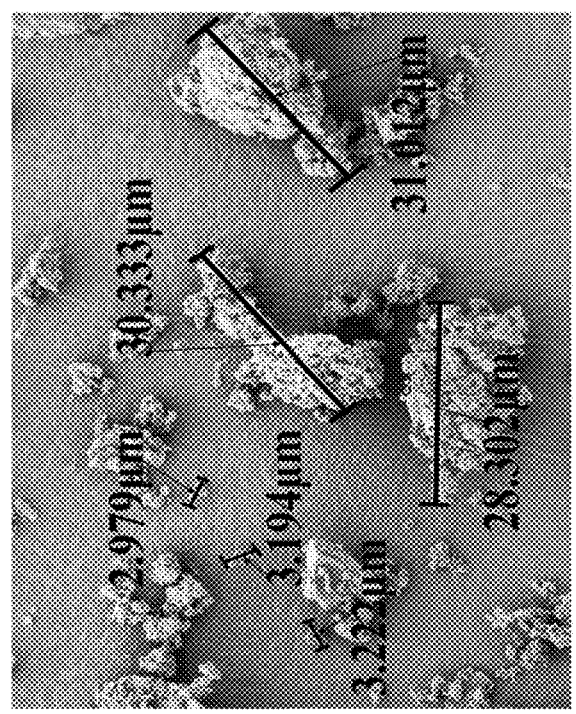
FIG. 1 is a scanning electron micrograph (SEM) image of swine waste biochar ("SB") clusters at 1,000× magnification.
Figure 2B:
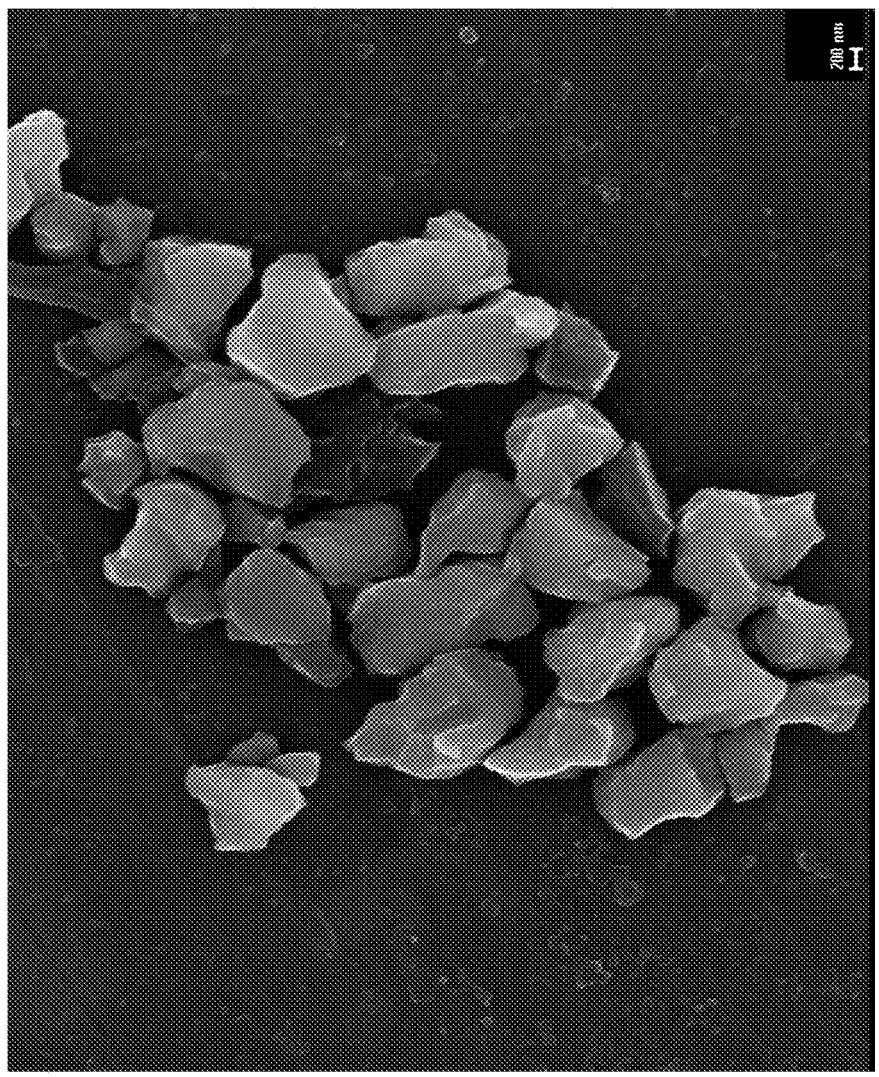
FIG. 2B is an SEM image of SB clusters at 10,000× magnification (200 nm scale).

The SEM images of SB clusters show rough exterior surfaces (FIG. 1). The SEM images of an SB cluster (FIG. 2) show a porous SB surface morphology, wherein white clusters represent SB particles and darker areas are pores within the SB cluster. SEM-EDS elemental analysis of SB showed carbon @ 54.02%; oxygen @ 30.60%; calcium @ 5.00%; silicon @ 0.95%; and aluminum @ 0.34%.

FTIR Spectra of SB and Cement

Figures 3, 4:
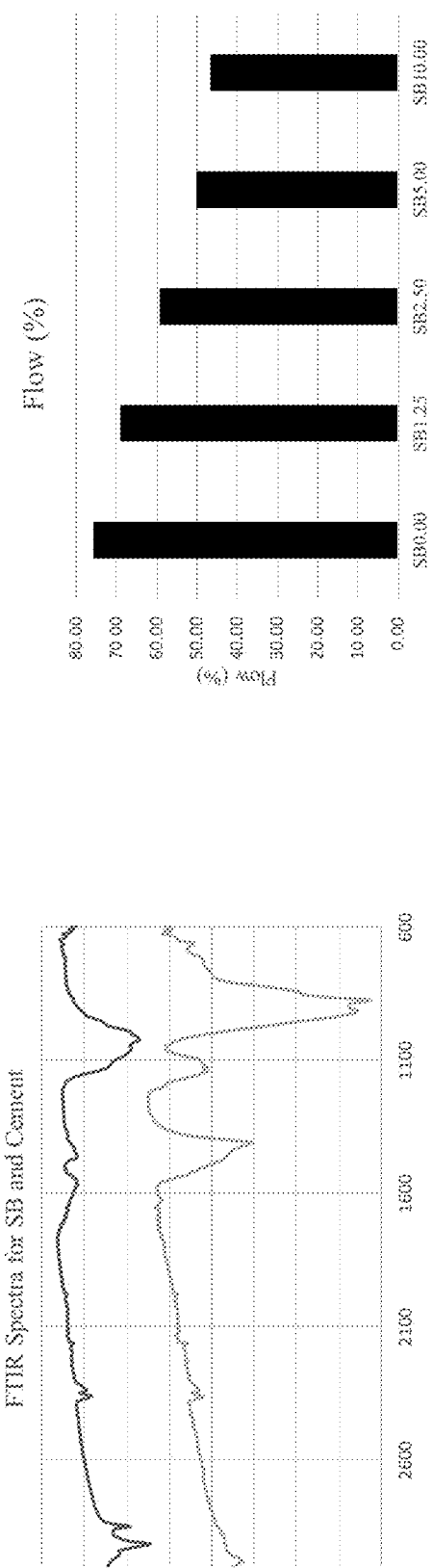
FIG. 3 is a composite figure of Fourier Transform Infrared (FTIR) spectra for SB (black line) and cement (grey line).
FIG. 4 is a bar graph of the flow of cement pastes SB0.00 (cement paste having 0% SB by weight), SB1.25 (cement paste where 1.25% by weight of cement is replaced by SB), SB2.50 (cement paste where 2.5% by weight of cement is replaced by SB), SB5.00 (cement paste where 5.00% by weight of cement is replaced by SB), and SB10.00 (cement paste where 10% by weight of cement is replaced by SB)

FTIR spectra (FIG. 3) showed a sharp doublet at 2848 $cm^{-1}$ and 2913 $cm^{-1}$ corresponding to C—H bonds of alkanes in SB. The doublet at 2330 $cm^{-1}$ and 2360 $cm^{-1}$ correspond to the presence of carbon dioxide, adsorbed within SB micropores. The asymmetrical stretch at 1564 $cm^{-1}$ was assigned to aromatic C=C bonds and C=O bonds in carboxyl groups in SB. The asymmetric stretch centered around 1465 $cm^{-1}$ was assigned for C—H bonds in SB. The C—O stretching bonds of the doublet feature at 1060 $cm^{-1}$ and 1002 $cm^{-1}$ were due to alcohols, ethers, carboxylic acids, and esters. The EDS and FTIR results are consistent with the presence of carboxyl groups in SB.

Strong FTIR signals (FIG. 3) of the cement sample at 1415 $cm^{-1}$ and 1145 $cm^{-1}$ confirmed the presence of carbonates and sulfates in Portland cement. The doublet feature at 920 $cm^{-1}$ and 875 $cm^{-1}$ was assigned to the Si—O asymmetric stretching vibrations, and reflected the presence of tricalcium silicates and dicalcium silicates.

Flow of SB Modified Cement Pastes

The presence of SB reduced the flow of cement pastes. In particular, SB10.00 had the least flow percent (47%), while SB0.00 had the highest flow percent (77%), FIG. 4. The reduction in cement paste flow correlates with increasing SB replacement, demonstrating that SB increased the viscosity of cement pastes.

Without being bound by theory the reduction in the flow of cement pastes supplemented with SB may be attributed to SB's carboxyl functional groups resulting in negative charges on the porous surfaces of SB. Upon addition of water the cement/SB binder dry mix, a portion of the water was adsorbed into the pores on the surface of carbonaceous SB. Due to its high surface areas and its high porosity, water was pulled into SB pores through capillary forces. The retention of some of the mixing water in the SB pores reduced the available mixing water. Higher replacement percentages of SB resulted in further reductions in capillary water, yielding closer packing of binder particles. Reductions in inter-particle distances were observed; as was increased viscosity and reduced flow of the SB-substituted cement pastes.

At a constant water/binder ratio, as the replacement percentage of SB was increased and that of cement was decreased, the flow of cement paste was reduced. Cement pastes with higher percentages of SB require higher water/binder ratios increasing the availability of mixing water, which improve flow and workability. The flow-reducing characteristic of cement pastes modified with SB provides for the development of flow-reducing binders.

Setting of SB-Modified Cement Pastes

Figure 5:
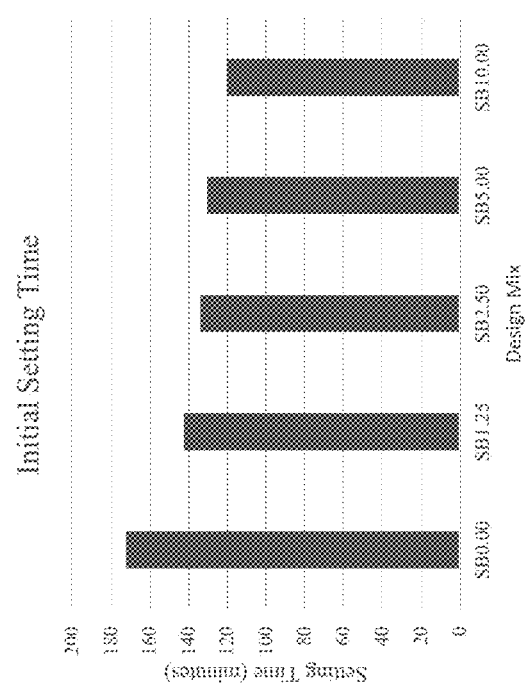
FIG. 5 is a bar graph of the initial setting time (in minutes) of cement pastes SB0.00, SB1.25, SB2.50, SB5.00, and SB10.00.

The presence of SB reduced the initial setting times of cement pastes; however, the setting times for all the SB-substituted cement pastes were within the acceptable limits prescribed by ASTM. FIG. 5 shows a consistently negative relationship between SB replacement percentages and the initial setting times of SB modified cement pastes: setting times of cement pastes decreased with increments of SB in the cement pastes. With 10% SB replacement ('SB10.00'), the initial setting time was 30% reduced when compared to SB0.00.

Without being bound by theory, the difference between the initial setting times of cement pastes with SB and the control cement pastes may be attributed to the development of Calcium Polycarboxylate Salts (C-P-S), initiated when water was added to the dry cement and SB binder mix.

Figure 6:
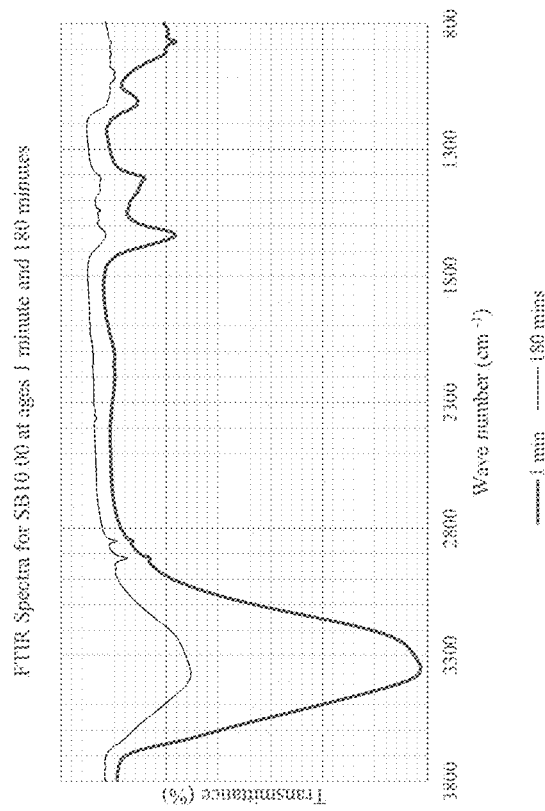
FIG. 6 is a composite figure of FTIR spectra of SB10.00 after aging for 1 minute (grey line) and 180 minutes (black line).

FIG. 6 shows the spectra for SB10.00 after aging for 1 minute and for 180 minutes following the addition of mixing water to the dry SB/cement binder mix. The presence of C-P-S is confirmed by the shifts shown in the FTIR spectra. Compared with the 1-minute spectrum, a reduction in the O—H stretch (3350 cm$^{-1}$) was observed in the 180-minute spectrum, perhaps due to consumption of capillary water during formation of both Calcium-Silicate-Hydrates (C-S-H) and Calcium-Polycarboxylate-Salts (C-P-S). A reduction in the stretch at 1630 cm$^{-1}$ and emerging weak stretches at 1571 cm$^{-1}$, 1538 cm$^{-1}$ and 1470 cm$^{-1}$ were observed in the 180-minute spectrum and were attributed to the vibrations of carboxylate anions that have reacted with calcium cations to form C-P-S. Slightly intensified C—H bonds for alkanes were observed at 2917 cm$^{-1}$ and 2850 cm$^{-1}$, perhaps observable due to the reduction in the amount of capillary water. The emergence of the stretch at 1010 cm$^{-1}$ was assigned to the C—O stretching in C-P-S.

Together with the EDS results, these FTIR results demonstrate the development of C-P-S reduced the setting times of SB modified cement pastes. The presence of C-P-S resulted in the creation of additional nucleation or seeding sites that enhanced the precipitation of more hydrates in the pore space. As shown herein, the use of SB as a cement paste replacement has rapid-setting concrete applications.

Example 2

Experimental Materials and Methods

Type 1/1A normal Portland cement (specific gravity of 3.15 and a pH between 12 and 13) as specified by the American Society for Testing Materials (ASTM C-150) was purchased from Home Depot. Potable water was obtained from a faucet in the Soils Laboratory at North Carolina Agricultural & Technical State University.

Swine-waste biochar (SB), a black carbon-rich powdery substance, was obtained from a thermochemical process as generally disclosed in Fini, E. H., Kalberer, E. W., Shahbazi, A., Basti, M., You, Z., Ozer, H., and Aurangzeb, A. "Chemical characterization of biobinder from swine manure: sustainable modifier for asphalt binder." Journal of Materials in Civil Engineering, 23(11), 2011, 1506-1513.

In particular, about 1 gallon of swine manure slurry (typically about 80%-95% liquid by weight), was charged in a 1.5 gallon autoclave. Nitrogen gas was used to purge the reactor three times. The purged reactor was then heated over the course of ~2.5 hours to a setting temperature of 340° C., and the pressure of raised to a reaction pressure of 10.3 MPa. The reaction was completed in about 15 minutes. The reactor was then cooled to room temperature using a recycled ice-water cooling coil over the course of at least about 2 hours. After cooling, the by-product gas was released from the autoclave, returning the reactor to atmospheric pressure.

The reaction mixture, including bio-oil, solid and aqueous phases, was vacuum filtered. The filtrate, typically referred to as black water, was isolated. The sticky residue was then rinsed once with 10-50% solvent (either acetone or a 30:70 acetone/toluene mixture) and vacuum filtered. The fine solid residue in the filter was isolated as bio-char The elemental composition of SB was obtained using the scanning electron microscopy-energy dispersive spectra (Table 2).

TABLE 2

Elemental Composition of SB

| Element | Percent | Element | Percent |
| --- | --- | --- | --- |
| Carbon | 54.02 | Phosphorus | 4.87 |
| Oxygen | 30.60 | Silicon | 0.95 |
| Calcium | 5.00 | Iron | 0.90 |
| Magnesium | 1.95 | Aluminum | 0.34 |

Using a Zetasizer Nano-S (Malvern instrument) Dynamic Light Scattering (DLS) the mean particle size of SB was 509.6 nm and the SB surfaces were negatively charged.

Following the mix proportions for the SB-modified cement pastes listed in Table 3, cement and SB were manually dry mixed for about 5 minutes to obtain a uniform binder mix. Potable water was placed in the mixing bowl of a 4.73 liter ELE mechanical mortar mixer (ASTM C305 compliant). The dry cement/SB binder mix was then added and allowed to sit for 30 seconds for water absorption. The mechanical mixer was started at a slow speed (139 revolutions per minute) and then mixed for 30 seconds. The mixer was then stopped for 15 seconds and the sides of the mixing bowl were scrapped. The mixer was re-started and the paste was mixed at medium speed (285 revolutions per minute) for 60 seconds. The specimens were then immediately extracted for the Vicat setting tests.

TABLE 3

Mix Proportions for SB-Modified Cement Pastes

| Design Mix | Cement (%) | SB (%) | Water/Binder Ratio |
| --- | --- | --- | --- |
| CP-SB00 | 100.00 | 0.00 | 0.28 |
| CP-SB10 | 90.00 | 10.00 | 0.28 |
| CP-SB15 | 85.00 | 15.00 | 0.28 |
| CP-SB20 | 80.00 | 20.00 | 0.28 |

For the FTIR and Raman spectroscopic analysis, cement and SB were manually dry mixed in a small plastic dish using the mix proportions listed in Table 3. Mixing water was then added to the dry ordinary Portland cement/SB binder mix and made to soak for 30 seconds for water absorption and then manually mixed for about 60 seconds. The specimens were extracted for FTIR and Raman tests. Shifts in characteristic peaks in the FTIR and Raman spectra were used to investigate hydration reactions during the setting of the modified cement pastes.

Fourier Transform Infrared Spectroscopy (FTIR) was used to obtain useful information regarding the development of key hydration products in SB modified cement pastes. FTIR analysis was conducted with a Varian 670 FTIR Spectrometer using a Pike "miracle" Attenuated Total Reflectance (ATR) accessory for Attenuated total internal reflection FTIR. In an ambient atmosphere, the background spectrum was collected before sample analysis. Sixteen scans were recorded over the measurement range between 400 and 4000 cm$^{-1}$, with a spectral resolution of 4 cm$^{-1}$. The obtained spectra were corrected with a linear baseline.

Raman Spectroscopy (Horiba XploRA One Raman Confocal Microscope System) was used to evaluate cement, SB, and all cement pastes. During each test, scanning was carried out from 150 $cm^{-1}$ to 3500 $cm^{-1}$. Samples were illuminated with a 532 nm laser. The exposure time for each scan was 10 seconds and about 1 minute was used to acquire each spectrum. The spectra were corrected using a linear baseline.

American Society for Testing and Materials (ASTM C191) for the time of setting of hydraulic cement by the Vicat Needle was followed to determine the initial setting times, as well as the final setting times of all cement pastes. The initial time of setting was recorded when a needle penetration of 25 mm was attained. Final setting was achieved when there was no complete circular penetration on the cement paste.

Results and Discussion

Early Hydration Products Detected by FTIR-ATR

FTIR (FIG. 7) confirmed the presence of O—H (3200 $cm^{-1}$-3600 $cm^{-1}$), C—H (2915 $cm^{-1}$, 2850 $cm^{-1}$), C═C and C═O (1500-1750 $cm^{-1}$), and C—O (1000-1300 $cm^{-1}$) surface functional groups for reactive carboxylic acids, esters, and ethers in SB modified cement pastes. NMR studies yielded similar results and found similar functional groups in SB. Characteristic peaks for silicates (916 $cm^{-1}$, 875 $cm^{-1}$), sulfates (1124 $cm^{-1}$), and carbonates (1405 $cm^{-1}$) from Portland Cement were observed.

Figure 7:
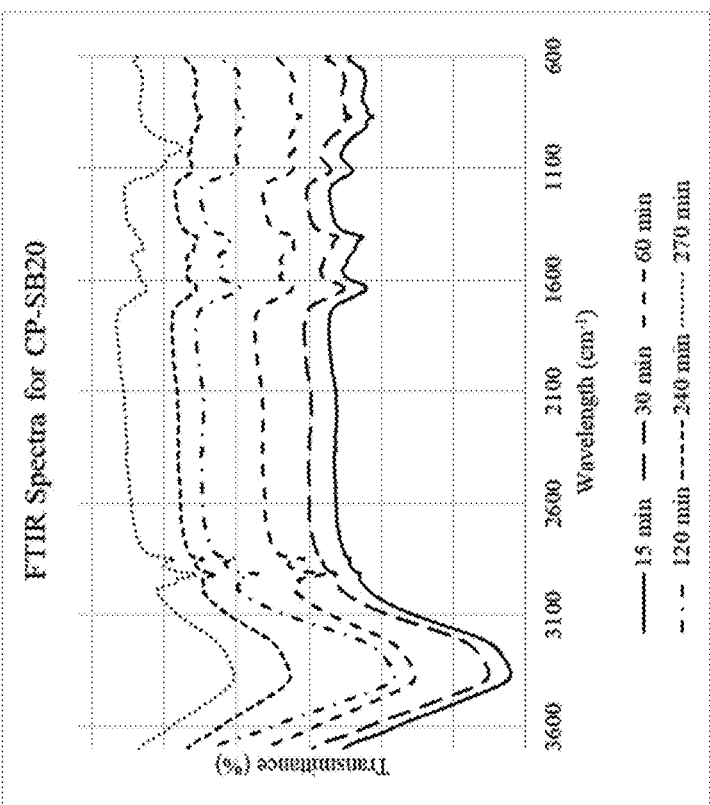
FIG. 7 is a composite figure of FTIR spectra for CP-SB20 (cement paste where 20% by weight of cement is replaced by SB) after aging for 15 minutes (solid line), 30 minutes (long dashes), 60 minutes (short dashes), 120 minutes (dash-dot-dash), 240 minutes (very short dashes) and 270 minutes (dotted line).

Capillary Water:

While the dry cement and SB had limited water bands at 3360 $cm^{-1}$, the 15-minute spectra in FIG. 7 showed that the most dominant feature in the FTIR spectra for CP-SB20 was the strong O—H stretch (3360 $cm^{-1}$). The negligible differences in the stretches during the first hour of hydration of CP-SB20 are a result of —OH groups participating in hydrogen bonding, indicating the incorporation of more water molecules in the system. Capillary water facilitates the hydration process by dissolving the cement minerals and contributing hydroxyl ions for the formation of hydroxyl groups. With the addition of water, the cement dissolves and calcium ions from calcium silicates leach quickly from cement into the mixing water. Also, deprotonation of carboxylic acid groups occur. As hydration proceeded, the water was consumed, consistent with a reduction in the intensity of the O—H stretch in the 270-minute spectra for CP-SB20. The stretch maximizing at 1633 $cm^{-1}$ for CP-SB20 was assigned to the stretching and bending modes of water in sulfates, particularly gypsum. The 1633 $cm^{-1}$ stretch in the SB modified pastes was associated with C═O and C═C bonds for carboxylic acids and aromatic alkenes from SB.

Calcium-Aluminate-Sulfate-Hydrate:

Prior to the addition of water, the bend at 1124 $cm^{-1}$ in the spectra for dry cement was assigned to S—O stretching for sulfates in cement. The 15-minute spectra (FIG. 7) for CP-SB20 shows that with the addition of water, there is a shift to a lower peak (1105 $cm^{-1}$), which was assigned to S—O stretching of $SO_4^{2-}$ in the development of calcium-aluminate-sulfate-hydrate (ettringite). With the addition of water, the rapid dissolution of sulfates is followed by crystallization.

Figure 8:
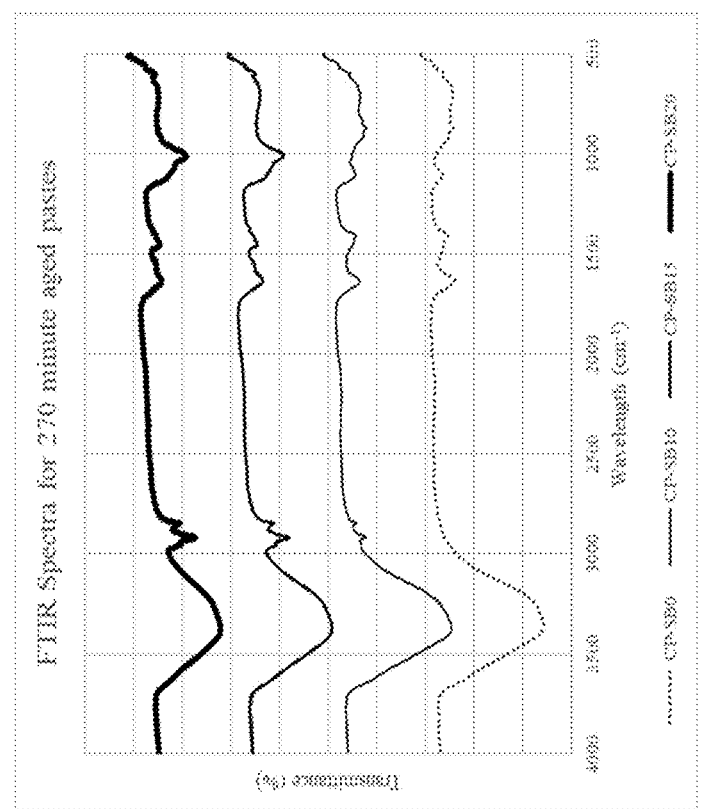
FIG. 8 is a composite figure of FTIR spectra for CP-SB pastes aged 270 minutes: CP-SB0 (cement paste where 10% by weight of cement is replaced by SB, dotted line), CP-SB10 (cement paste where 10% by weight of cement is replaced by SB, thin black line), CP-SB15 (cement paste where 15% by weight of cement is replaced by SB, medium black line) and CP-SB20 (cement paste where 20% by weight of cement is replaced by SB, heavy black line).

Calcium-Carboxylate-Salts (C-C-S):

The earliest appearance of C-C-S was observed as weak bends on the FTIR spectra (1459 $cm^{-1}$ and 1538 $cm^{-1}$) as early as 15 minutes after water was added to CP-SB20. The weak bends become more distinct and strengthen with time as hydration progresses. More developed bends, as shown in the 60-minute spectra for CP-SB20, correlate to the salts of carboxylic acids. The weak peaks observed at 1538 $cm^{-1}$ and 1575 $cm^{-1}$ in the 60-minute spectra were assigned to carboxylate groups at multi-layer coverage in precipitated C-C-S. As shown in FIG. 7, this doublet becomes more distinct with time as hydration progresses and the stretches for capillary water (3360 $cm^{-1}$) and carboxyl groups (1633 $cm^{-1}$) appear to reduce in intensity. Upon addition of mixing water to the dry cement/SB mix, the carboxylic acids (—COOH) found in SB readily dissociated into carboxylate anions with the release of hydrogen ions (deprotonation), resulting in an increase of carboxylate anions (COO—) in the pastes. Concurrently, there was a release of calcium cations from cement. Calcium cations from cement replaced the hydrogen deprotonated from the carboxylic acids and resulted in the development of calcium-carboxylate-salts (C-C-S). The emergence of more distinctive peaks at 1459 $cm^{-1}$, 1538 $cm^{-1}$, and 1575 $cm^{-1}$ in the 270-minute spectra for CP-SB20 confirmed that these acid-base reactions continued to make significant progress within the SB modified cement pastes. The small changes in the shape of these bands are associated with the structural and conformation changes that occur as the calcium cations replace hydrogen ions in the polymer chain. The FTIR doublet at 1540 $cm^{-1}$ and 1575 $cm^{-1}$ are correlated to the coordinated structure of carboxylate groups with calcium ions. The presence of C-C-S is further validated with the emergence of weak stretches at 1031 $cm^{-1}$ in the 60-minute spectra for CP-SB20 and is assigned to C—O bonds in C-C-S. This bend for C—O bonds in C-C-S intensifies as hydration progresses as shown in the 270-minute spectra. Furthermore, the stretches for C—H bonds (2915 $cm^{-1}$ and 2850 $cm^{-1}$) for alkyl groups in CP-SB20 become more dominant as hydration progresses, being most dominant in the 270 minute spectra for CP-SB20. Notably, FIG. 8 shows that the stretches (2915 cm-1, 2850 cm-1, 1575 cm-1, 1538 cm-1, 1454 cm-1, and 1031 cm-1) for C-C-S in CP-SB20 are absent in the control cement paste (CP-SB00), because it has no SB and as such no organic surface functional groups. C-C-S bands are most intense in CP-SB20 because it has the highest SB content.

Figure 9:
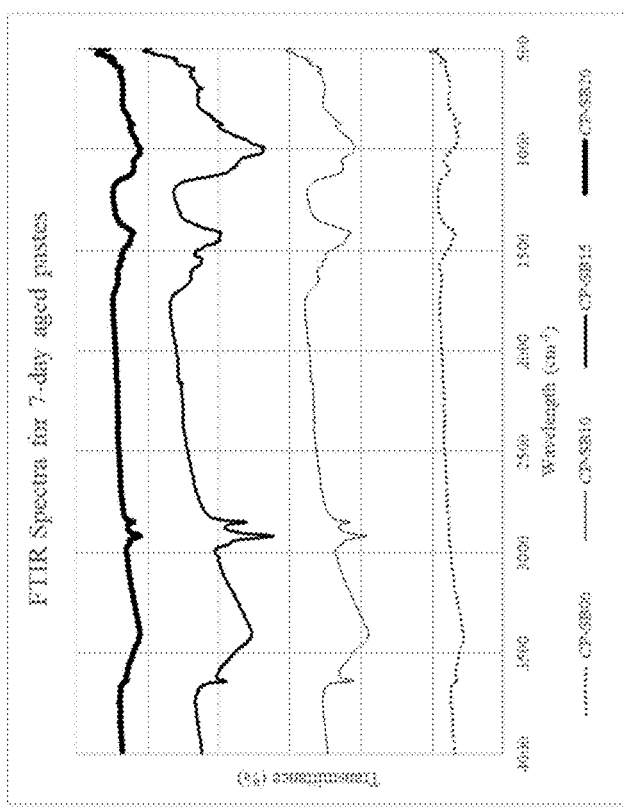
FIG. 9 is a composite figure of FTIR spectra for cement pastes aged for seven days: CP-SB0 (dotted line), CP-SB10 (thin black line), CP-SB15 (medium black line) and CP-SB20 (heavy black line).

Calcium-Silicate-Hydrate:

A key hydrate associated with strength development, C-S-H, was not detected early but emerged later in the 270-minute spectra for CP-SB20 (FIG. 7). The appearance of a slight shoulder (995 $cm^{-1}$) as a result of the shift from the undissolved cement peak (916 $cm^{-1}$) was attributed to the polymerization of silicate units (SiO44-) with formation of C-S-H phase. FIG. 9 shows that even after 270 minutes of hydration, the shift for C-S-H polymerization had not occurred yet in the control paste (CP-SB00), nor in the paste with the least amount of SB (CP-SB10).

The Si—O asymmetric stretching vibration of undissolved calcium silicates (910 $cm^{-1}$) in Portland cement were still present in CP-SB00 and CP-SB10. Clinker (undissolved calcium silicates in cement) dissolution is typically correlated with C-S-H formation. Notably, the clinker bands almost completely disappeared in the 270-minute spectra for CP-SB15 and CP-SB20, suggesting that clinker consumption progressed at a much higher rate in SB modified cement pastes. Without being bound by theory, SB may have also created additional nucleation sites for the development of C-S-H, thus accelerating the polymerization of C-S-H in SB modified cement pastes. C-S-H developed on the calcium silicate particles, while calcium hydroxide crystals grow in the pore space.

Calcium Hydroxide:

FTIR stretches for calcium hydroxide (CH) were not observed in any of the 270-minute spectra. However, CH was observed at 3637 $cm^{-1}$ in all the 7-day pastes (FIG. 9). During the dissolution of the calcium silicate phases in cement, chemical reactions between OH— and $Ca^+$ can result in the precipitation of CH.

Early Hydration Products Detected by Raman

In agreement with FTIR results, Raman spectra showed the presence of C—C (955 $cm^{-1}$, 770 $cm^{-1}$), C—COO (1574 $cm^{-1}$, 875 $cm^{-1}$), and C—H (1474 $cm^{-1}$, 1353 $cm^{-1}$) surface functional groups. Peaks for aluminates (761 $cm^{-1}$, 525 $cm^{-1}$), calcium silicates (849 $cm^{-1}$), gypsum (1016 $cm^{-1}$), and carbonates (1098 $cm^{-1}$) were observed in the Raman spectra for Portland Cement. These data confirmed that SB is not inert, and that chemical reactions occurred when water was added to SB modified cement. Consistent with the data, four key hydration products were formed with the addition of water: calcium-carboxylate salts, calcium-silicate-hydrate, calcium-aluminate-sulfate-hydrate, and calcium hydroxide.

Calcium-Carboxylate-Salts (C-C-S):

After 60 minutes, the most dominant peaks during the setting of cement pastes modified with SB were for C—H (1469 $cm^{-1}$, 1357 $cm^{-1}$ and 1089 $cm^{-1}$) and COO— (1598 $cm^{-1}$ and 880 $cm^{-1}$) in C-C-S in CP-SB15 and CP-SB20). An increase in the intensities of the CP-SB20 peaks (1338 $cm^{-1}$, 1455 $cm^{-1}$, and 1582 $cm^{-1}$) corresponding to progressive increments in C-C-S was noted when the 90 minute spectrum for CP-SB20 was compared its 270 minute spectra. In the 270-minute spectra, a peak emerged at 1629 $cm^{-1}$, which is attributed to aluminum-carboxylate-salts (A-C-S), as formed from reaction of aluminum cations from the dissolution of tricalcium aluminates in cement with the carboxylate anions from SB.

Calcium-Silicate-Hydrate (C-S-H):

The peaks observed at 460 $cm^{-1}$ and 625 $cm^{-1}$ in CP-SB00 were assigned to polymerized C-S-H from the hydration of calcium silicates in cement; while in CP-SB15 and CP-SB20, the peaks at 430 $cm^{-1}$ and 600 $cm^{-1}$ were assigned to polymerized C-S-H. This shift to a lower Raman frequency for C-S-H was consistently observed in all the other SB modified cement pastes. Without being bound by theory, the lower C-S-H peaks in the SB modified pastes may be attributed to changes in the bond length and strength of C-S-H, as a result of the earlier development of C-C-S in the SB modified cement pastes. These findings provided strong evidence that C-C-S from SB had intruded in the growth and maturation of C-S-H, and perhaps weakened the linkages and microstructural development of C-S-H in the cement pastes modified with SB. The C-S-H peaks in the SB modified pastes appeared to be more intensive, suggesting that C-S-H had developed much faster in the SB modified pastes, as compared to the control paste. Without being bound by theory, this may be explained by the additional nucleation sites created by SC that allowed C-S-H to develop much faster in the SB modified cement pastes.

Calcium-Aluminate-Sulfate-Hydrate:

The peaks at 987 $cm^{-1}$ in SB modified pastes and 995 $cm^{-1}$ in CP-SB00 are assigned to ettringite. The lower Raman shifts for the hydrates in the SB modified cement pastes was attributed to the interference from C-C-S. Unhydrated calcium silicates were also observed at 519 $cm^{-1}$ and 854 $cm^{-1}$ in both pastes.

Calcium Hydroxide:

Two peaks (1483 $cm^{-1}$ and 1613 $cm^{-1}$) were assigned to calcium hydroxide in the control pastes These Raman peaks are masked by the C-C-S peaks in the cement pastes modified with SB.

Setting Times of Cement Pastes Vicat Needle Test

Figure 10:
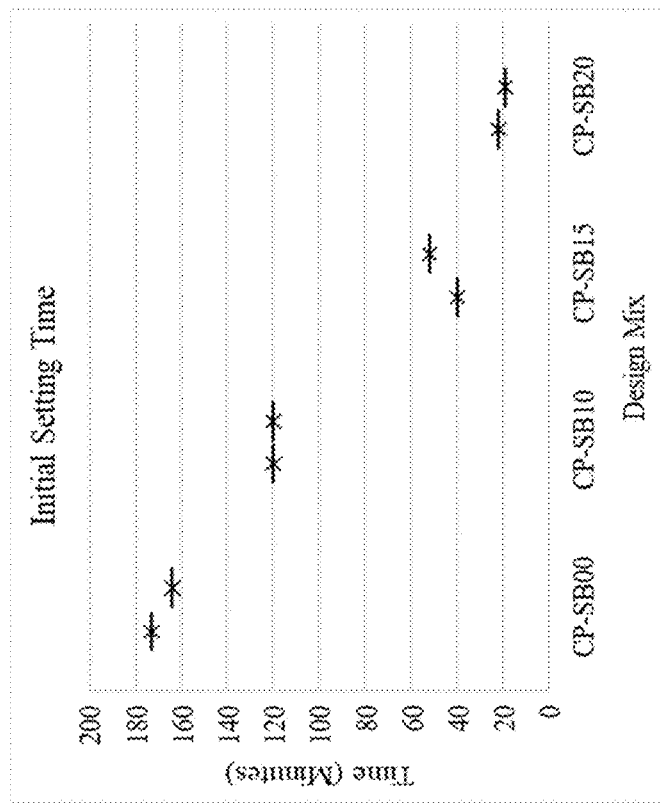
FIG. 10 is a graph of the initial setting time (in minutes) for cement pastes: CP-SB00, CP-SB10, CP-SB15, and CP-SB20.

Results from the Vicat Needle Time of Setting Test (FIG. 10) showed that the replacement of 20% of ordinary Portland cement with SB (CP-SB20) resulted in an 88% reduction in the initial setting time. Considering that the ASTM standard requires initial setting times to be at least 45 minutes, the results obtained for CP-SB20 do not satisfactorily meet performance prescriptions, as the SB modified cement paste set too fast. Thus, at a 0.28 water/binder ratio, SB replacement percentage in one embodiment disclosed herein does not exceed 15%.

Figure 11:
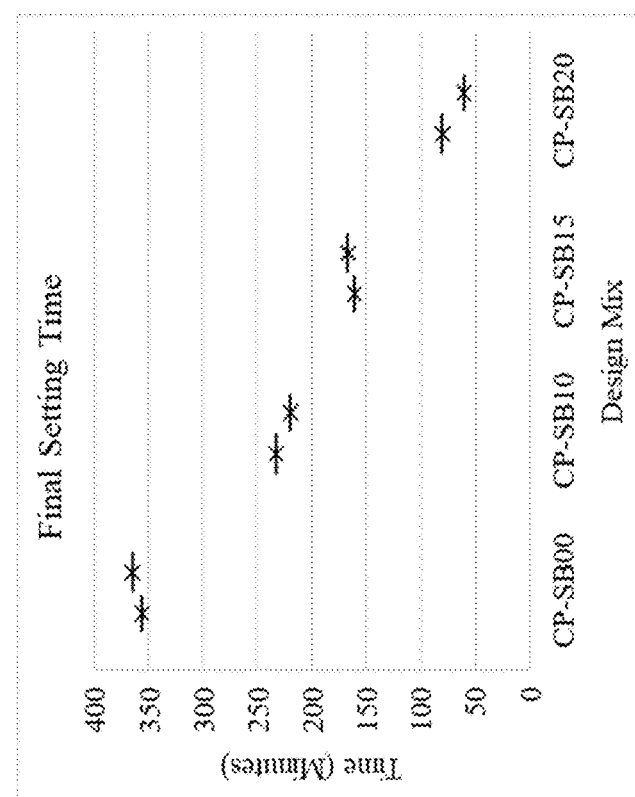
FIG. 11 is a graph of the final setting time (in minutes) for cement pastes: CP-SB00, CP-SB10, CP-SB15, and CP-SB20.

Compared to CP-SB00, an 80% reduction in the final time of setting was observed when 20% of ordinary Portland cement was replaced with SB (CP-SB20). (FIG. 11) Without being bound by theory, the rapid setting of SB modified cement pastes can be attributed to the early and rapid precipitation of C-C-S.

During the typical inactive induction period of the control cement pastes (CP-SB00), as shown herein C-C-S in cement pastes modified with SB continued to develop and mature. The presence of SB in pastes provided additional nucleation sites in the pore spaces and advanced the accelerated development and setting of the hydration products. These additional nucleation sites resulted in faster interactions and linkages among the different hydrated products, thus accelerating the setting of SB modified cement pastes. SB first disperses non-uniformly in the cement paste. After that, reactive carboxylic acid surface functional groups present in SB react with calcium ions from cement to form C-C-S. As hydration proceeded and the capillary water was consumed, C-C-S and other key Portland cement hydrated products coalesce to form a solid paste.

Example 3

Experimental Materials and Methods

Type 1/1A Portland cement met the standard composition requirements specified by the American Society for Testing Materials (ASTM). Cement has a specific gravity of 3.15, and the bulk density of bagged cement is approximately 1000-1300 $kg/m^3$. Mixing water was obtained from the Soils Laboratory at NC A&T State University.

SB340 is the black carbon that was obtained swine-manure as disclosed in Examples 1 and 2. After the initial isolation from a reaction at 340° C. (yielding 'SB340'), SB340 underwent additional treatments at 400° C., 600° C., and 800° C. for 2 hours in a laboratory furnace in the presence of nitrogen gas, yielding specimens SB400, SB600, and SB800, respectively.

The elemental composition of each sample was obtained using the scanning electron microscopy-energy dispersive spectra. The samples were prepared by adhering the powder to an aluminum stub using carbon tape. An environmental SEM (Zeiss Evo LS-10) was used at 50 Pa operating pressure ($N_2$ gas) and 20 kV gun voltage. The Zetasizer Nano-S (Malvern instrument) Dynamic Light Scattering instrument was used for particle size analysis.

The textural properties of samples were determined using the Micromeritics ASAP 2020 instrument. The dry samples (0.08 g-0.2 g) were degassed in a $N_2$ atmosphere at a temperature of 120° C. for 4 h. The degassed sample was then subjected to physisorption analysis with $N_2$ as the adsorbate gas in a liquid nitrogen bath at 77 K. The multi-layer adsorption model by Brunauer-Emmett-Teller was used to calculate the surface area, while the pore volume was evaluated using the Barrett-Joyner-Halenda model.

FTIR analysis for surface functional groups of the samples was conducted using a Varian 670 FTIR Spectrometer with a Pike "miracle" attenuated total reflectance accessory for attenuated total internal reflection FTIR. In an ambient atmosphere, the background spectrum was collected before analyzing the samples. In total, 16 scans were recorded over the measurement range between 400 and 4000 cm$^{-1}$, with a spectral resolution of 4 cm$^{-1}$. The obtained spectra were corrected with a linear baseline.

Following the single-step method described in ASTM D7348-13, the loss of ignition (LOI) was used to estimate the volatile and organic matter in SB samples (American Society for Testing and Materials, 2013). Approximately, 1 g of SB was placed in a crucible and weighed (W1) before combustion in a furnace. The furnace was heated at 10° C./min to gradually raise its temperature to 500° C. at the end of 1 h. Heating was continued at a ramp rate of 8° C./min until temperature rose from 500° C. to 950° C. The combustion temperature was maintained at 950° C. for an additional 2 hours and then allowed to cool to room temperature. The crucible with SB ash was weighed (W2). The following equation was used to calculate LOI for each sample:

$$LOI = \frac{(W_1 - W_2) \times 100}{W_1}$$

The dry bulk density (DBD) of the dry SB (10 g) samples was obtained by dividing the mass (M) of each sample by its corresponding volume (V) in a volumetric cylinder. The following equation was used to calculate the LBD of each sample:

$$DBD = \frac{M}{V}$$

The DBD of the dry cement/SB binder mix was obtained after manually mixing 8.5 g of cement with 1.5 g of SB for about 5 minutes to obtain a uniform dry cement/SB binder mix. The volume of the mix was measured using a volumetric cylinder. Using Equation (2), the DBD of the 10 g blended dry cement/SB binder were also determined. Table 4 shows the mix proportions for all the different dry cement/SB binder blends utilized in this example.

TABLE 4

Mix design for SB modified cement pastes

| Mix design | Cement (%) | SB (%) | SB treatment temperature | Water/binder ratio |
|---|---|---|---|---|
| CP0.00 NOSB | 100.00 | 0.00 | Not applicable | 0.28 |
| CP1.25 | 98.75 | 1.25 | 340° C. | 0.28 |
| CP2.50 | 97.50 | 2.50 | 340° C. | 0.28 |
| CP5.00 | 95.00 | 5.00 | 340° C. | 0.28 |
| CP10.00 | 90.00 | 10.00 | 340° C. | 0.28 |
| CP15.00 | 85.00 | 15.00 | 340° C. | 0.28 |
| CP20.00 | 80.00 | 20.00 | 340° C. | 0.28 |
| CP0.00 NOSB | 100.00 | 0.00 | Not applicable | 0.40 |
| CP15-340 | 85.00 | 15.00 | 340° C. | 0.40 |
| CP15-400 | 85.00 | 15.00 | 400° C. | 0.40 |
| CP15-600 | 85.00 | 15.00 | 600° C. | 0.40 |
| CP15-800 | 85.00 | 15.00 | 800° C. | 0.40 |

Following the mix design in Table 4, the dry cement/SB binders were manually mixed for about 5 minutes until a homogenous mix was obtained. After that, the ASTM wet mechanical mixing process (ASTM C305-14) was followed and the wet cement pastes were placed in 50 mm×50 mm×50 mm cube molds and sprinkle cured for seven days at room temperature (~23° C.). After initial weights of 7-day and 28-day old cement paste samples were taken, they were oven dried and weighed every 24 hours until a consistent oven dry mass (M0) was obtained. Using the volume of each cube (Vc), the oven dry densities (ODD) of each oven dry cube sample was obtained using the following equation:

$$ODD = \frac{(M_0) \times 100}{V_c}$$

The samples were then fully immersed in water. The mass of each sample ($M_t$) was taken at specific times (t) after initial immersion (t=0). During the initial water absorption period, the mass ($M_t$) of each specimen at the following times (t) after initial water immersion: 1, 5, 10, 20, 30, 40, 50, and 60 minutes. The following equation was used to calculate the water absorption percentage ($WAP_t$) for each sample at the specified time (t):

$$WAP_t = \frac{(M_t - M_0) \times 100}{M_0}$$

Results and Discussion

Physical characteristics of SBs

Table 5 shows that with increments in SB treatment temperatures, mean particle size reduced from 822 nm for SB340 to 405 nm for SB800. Particle size reductions were attributed to the fact that with increasing treatment temperatures, the more labile organic matter and volatile substances present on SB surfaces evaporated. SB surface areas increased from 9.3 m$^2$/g for SB340 to 50.9 m$^2$/g for SB600. This correlated well with pore volumes which also increased from 0.041 cm$^3$/g in SB340 to 0.105 cm$^3$/g in SB600. Lower surface areas and larger particle sizes observed in low treatment temperatures (LTT)-SBs (SB340,

TABLE 5

Properties of cement and SBs

| Properties | SB340 | SB400 | SB600 | SB800 |
|---|---|---|---|---|
| Particle size (nm) | 822.017 | 545.950 | 500.300 | 405.033 |
| Surface area (m$^2$/g) | 9.300 | 16.800 | 50.900 | 27.600 |
| Pore volume (cm$^3$/g) | 0.041 | 0.069 | 0.162 | 0.105 |
| Pore diameter (nm) | 15.800 | 17.800 | 13.000 | 15.100 |
| Loss-on-ignition (%) | 3.030 | 1.960 | 0.960 | 0.870 |
| Dry bulk density (g/cm$^3$) | 0.340 | 0.340 | 0.320 | 0.330 |

SB400). At high treatment temperatures (HTTs) (600° C., 800° C.), the aromatization, dehydrogenation and dehydration of amorphous carbon chains to more crystalline carbons increased the total porosity. This implied that the release of the volatile components in SB resulted in the generation of more micropores in SB thereby reducing the particle sizes, while increasing the surface areas and pore volumes in HTT-SBs.

The surface area of SB800 was ~50% less than that of SB600. This is indicative of the fact that the formation of the high ash content (at 800° C.) resulted in the collapse of the pore structure, thereby decreasing the average pore volume and surface area, but increasing the pore diameter. The lower LOIs obtained for HTT-SBs confirmed their higher ash content and lower volatile matter when compared to the LTT-SBs. The loss of volatile matter is mostly attributed to reactions associated with organic carbon burning. All the SBs had LOI values that were lower than the allowable maximum LOI limits specified for fly ash in ASTM C618-17 (American Society for Testing and Materials, 2017). Considering that unburned carbon in cement replacement materials such as fly ash significantly affects the color and water requirement for normal consistency in concrete mixtures, SBs with LOIs lower than specified ASTM limits are most beneficial for concrete performance. The dry bulk densities of LTT-SBs were slightly higher than those of HTT-SBs as a result of the more dominant presence of volatile matter in LTT-SBs. However, all SB samples had bulk densities that were <50% of the bulk density of cement (1.00 g/cm$^3$). Compared to SBs, Portland cement had lower surface area (2.3 m$^2$), pore diameter (9.4 nm), and pore volume (0.004 cm$^3$/g).

SEM images revealed the porous and amorphous surfaces of clusters of SB340, SB600, and SB800. In agreement with the pore diameter results, SB600 appeared to have the most uniform surfaces with smaller SB clusters and pore sizes. Significant textural differences were not observed in the bio-chars because they were of the same feedstock.

Surface Elemental Composition

Table 6 shows that carbon and oxygen were the dominant elements in SB. Carbon content reduced from SB340 (46.9 percent) to SB600 (28.75 percent), after which it increased in SB800 (53.76 percent). This was because as treatment temperature increased from 340° C. to 600° C., decarbonation of the amorphous/labile carbon portions of the organic matter (celluloses, lignin, sugars,

TABLE 6

Properties of cement and SBs

| | Percent Composition of Elements | | | | |
|---|---|---|---|---|---|
| Element | Cement | SB340 | SB400 | SB600 | SB800 |
| Carbon | | 46.9 | 44.94 | 28.75 | 53.76 |
| Oxygen | 61.62 | 38.62 | 40.16 | 44.26 | 34.46 |
| Calcium | 29.94 | 3.11 | 4.28 | 9.18 | 2.21 |
| Silicon | 5.2 | 1.09 | 0.76 | 2.21 | 1.48 |
| Aluminum | 1.9 | ND | 0.49 | 0.91 | 0.37 |
| Sulfur | | ND | 0.85 | ND | 0.92 |
| Magnesium | | 4.32 | 2.78 | 4.12 | 2.67 |
| Phosphorus | ND | 5.96 | 5.75 | 10.56 | 4.12 |

(ND = Not detected)

hydrocelluloses, aminoglycans) also increased. Although the amorphous carbon content decreased with increasing temperature, the more crystalline Sp2 hybridized (aromatic and olefins) recalcitrant carbon fractions of the SB (which are more resistant to thermal degradation) increased as temperature was increased to 800° C. The decarbonation of amorphous carbon was accompanied by increases in the percentage of minerals. The composition of minerals increased from 14.48% in SB340 to 26.98% in SB600. The reduction of minerals components from 26.98% in SB600 to 11.77 percent in SB800 was attributed to the melting and vaporization of minerals such as phosphorus at 800° C.

The O/C ratio was highest in SB600 (1.54) and lowest in SB800 (0.64). At 600° C., there was significant decomposition of the mineral oxides and oxygenated salts resulting in the increase in oxygen. In contrast the very low O/C ratio at 800° C. indicated that most minerals had been converted to ashes with minimal oxygen content at that temperature. Concurrently, minerals such as phosphorus were reduced as well in SB800, when compared to the lower temperature SBs. Phosphorus was the most dominant element in SB800.

Surface Functional Groups by FTIR

Figure 12:
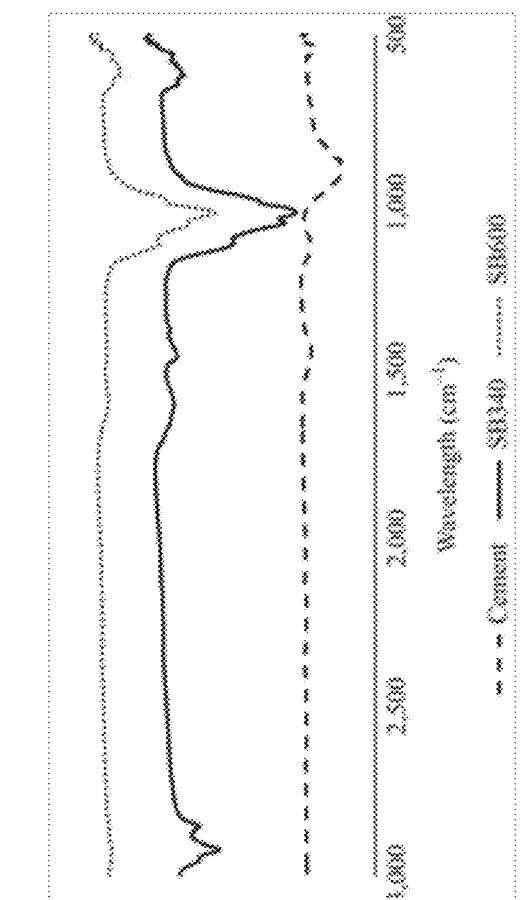
FIG. 12 are FTIR spectra of cement and SB340 (SB produced at 340° C.) and SB600 (SB produced at 600° C.).

FIG. 12 shows that with increments in temperatures from 340° C. to 600° C., there was reduction in the intensity of peaks for aliphatic C—H/CH$_3$ functional groups observed at 2,930 cm$^{-1}$, 2,860 cm$^{-1}$, and 1,480-1,350 cm$^{-1}$. In agreement with the SEM-EDX and LOI results, this loss is attributed to the decompositions of residual tars and oils that resulted in the release of H$_2$ and CH$_4$, at HTTs.

Compared to SB340, aromatic C=O and C=C in esters and carboxyl groups in SB600 decreased with temperature increases as indicated by the reduction in intensity peaks at 1,745-1,508 cm$^{-1}$. Notably, the stretches from 1,000 to 1,300 cm$^{-1}$ for C—O in esters and carboxyl groups were dominant in both SB340 and SB600.

Effect of SB Percentage on Water Absorption

Figure 13:
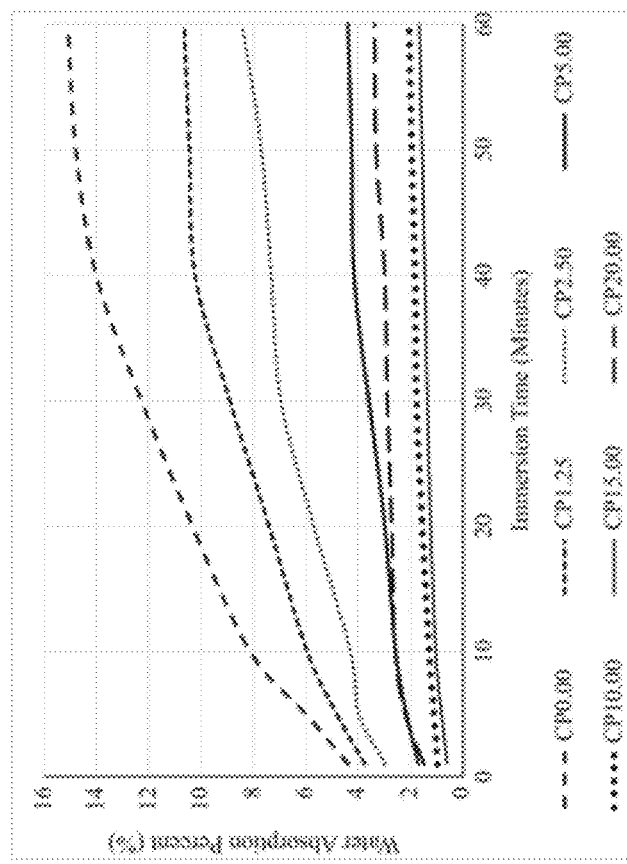
FIG. 13 is a graph of percent water absorption as a function of time for cement pastes: CP0.00 (cement paste having 0% SB by weight, medium dashed line), CP1.25 (cement paste where 1.25% by weight of cement is replaced by SB, short dashed line), CP2.50 (cement paste where 2.50% by weight of cement is replaced by SB, small dotted line), CP5.00 (cement paste where 5.00% by weight of cement is replaced by SB, thick solid line), CP10.00 (cement paste where 10.00% by weight of cement is replaced by SB, large dotted line), CP15.00 (cement paste where 15.00% by weight of cement is replaced by SB, thin solid line), CP20.00, (cement paste where 20.00% by weight of cement is replaced by SB, long dashed line).

FIG. 13 shows that WAPs were lower in all seven-day old hardened SB340 modified cement pastes, when compared to the control (CP0.00). Mostly, WAPs reduced with increments in SB percentages. At an LTT of 340° C. and a water/binder ratio of 0.28, CP15.00 had the lowest WAP, an 88% reduction when compared to CP0.00. With the exception of CP1.25, significant differences (p<0.01) existed between the WAPs of CP0.00 and all the other SB modified cement pastes. Without being bound by theory, it is believed that the presence of hydrophobic alkyl surface groups from the residual volatile matter were more dominant in SB modified cement pastes that had higher percentages of SB and correspondingly lower percentages of cement.

Figure 14:
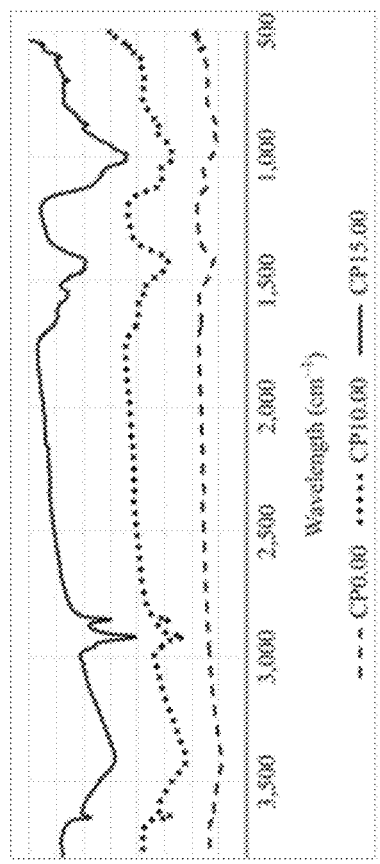
FIG. 14 is a composite figure of FTIR spectra for CP0.00 (cement paste having 0% SB340 by weight, dashed line), CP10.00 (cement paste where 10.00% by weight of cement is replaced by SB340, dotted line), CP15.00 (cement paste where 15.00% by weight of cement is replaced by SB340, solid line).

Reduction in WAPs of SB modified cement pastes is mostly attributed to the presence of hydrophobic aliphatic C—H surface functional groups in residual bio-oils and tars that were unable to escape at 340° C. (FIG. 14). The stretches at 2,850 cm$^{-1}$ and 2,917 cm$^{-1}$ in CP10 and CP15 were due to the hydrophobic alkyl surface groups in SB modified cement pastes. The capillary pores of these SB modified cement pastes were functionalized with hydrophobic alkyl groups that rendered their surfaces hydrophobic, and thus created negative capillary forces in the pores of the cement pastes, which effectively resisted, and reduced water entry into the pastes. With increments of SB in cement pastes, the presence of these hydrophobic alkyl surface functional groups increased and this reduced WAPs in SB modified cement pastes.

Despite the fact that cement had lower surface areas (2.3 m$^2$) and smaller pore volumes (0.004 cm$^3$/g) when compared to SB340, the control cement pastes (CP0.00) still absorbed more water. This confirmed that SB surface functional groups, and not textural properties, greatly influenced the water absorption differences observed between the control cement paste (CP0.00) and the SB modified cement pastes. As shown in FIG. 14, the stretches at 2,850 cm$^{-1}$ and 2,917 cm$^{-1}$ in CP10 and CP15 for hydrophobic surface groups in SB modified cement pastes are noticeably missing in CP0.00. The presence of hydrophobic surface groups and the lowest WAP in CP15 signified with that, cement pastes with up to 15% of SB340 demonstrated the best potential to reduce water absorption, and consequently, improve the durability of concrete in aggressive environments.

Effect of Water/Binder Ratio on Water Absorption

Figure 15:
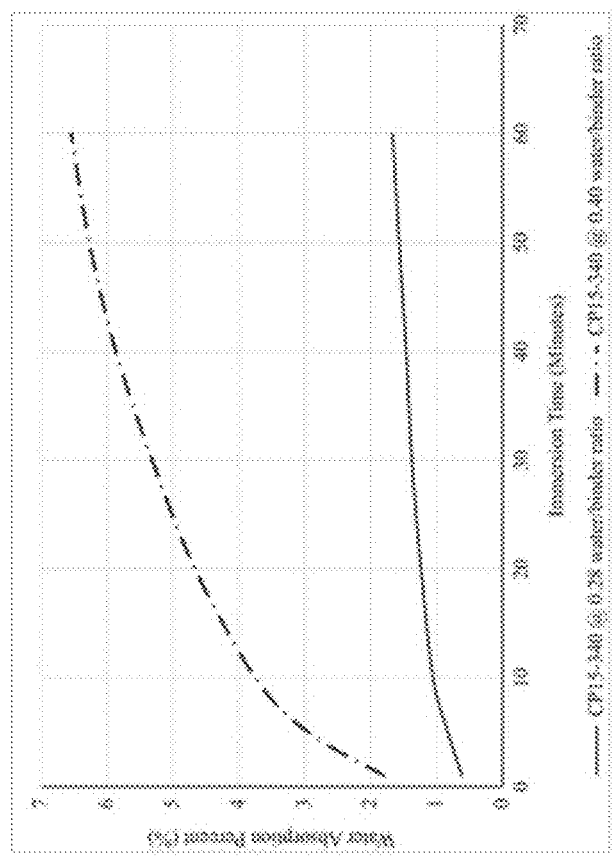
FIG. 15 is a graph of water absorption percent as a function of immersion time (in minutes) for CP15-340 at a 0.28 water/binder ratio (cement paste where 15.00% by weight of cement is replaced by SB340, solid line) and CP15-340 at a 0.40 water/binder ratio (dotted line).

FIG. 15 shows that SB modified cement pastes with the higher water/binder ratio (0.4) had higher WAPs. Compared to the 0.40 water/binder paste, there was a 72.89% reduction in the WAPs of the 0.28 water/binder pastes. The differences were statistically significant (p<0.01), and attributed to the higher water content in the 0.40 paste.

As a greater volume of the pastes were occupied by water, a less dense paste with a weaker microstructure resulted. Upon the evaporation of excess water during oven heating, the escaped water left greater voids in the 0.4 pastes. This led to an overall increase in the capillary porosity of the 0.4 water/binder pastes, and consequently, a more positive water sucking pressure that imbibed more water to fill the empty capillary pores within the pastes.

Effect of SB Treatment Temperatures on the Water Absorption

Figure 16:
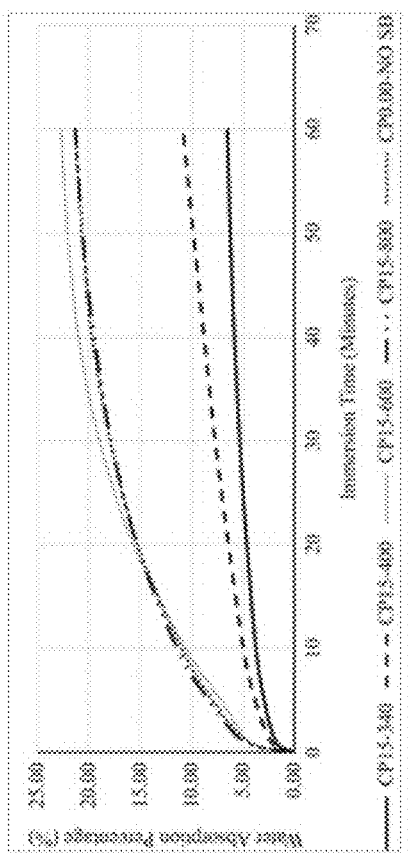
FIG. 16 is a graph of water absorption percent as a function of immersion time (in minutes) of cement pastes: CP15-340 (cement paste where 15.00% by weight of cement is replaced by SB340, thick solid line), CP15-400 (cement paste where 15.00% by weight of cement is replaced by SB400, dashed line), CP15-600 (cement paste where 15.00% by weight of cement is replaced by SB600, thin solid line), CP15-800 (cement paste where 15.00% by weight of cement is replaced by SB800, dash/dotted line), and CP0.00-NO SB (cement paste having 0% SB340 by weight, dotted line).

Among all the seven-day old samples, FIG. 16 shows that CP15-340 had the lowest WAP. Compared to the control paste, a 67.27% reduction was observed in CP15-340 and this difference was statistically significant (p<0.01). Furthermore, a wide gap existed between the WAPs of LTT-SB pastes (CP15-340 and CP15-400) and those of HTT-SB pastes (CP15-600 and CP15-800). No significant differences were observed between the HTT-SB cement pastes and the control pastes.

Figures 17, 18:
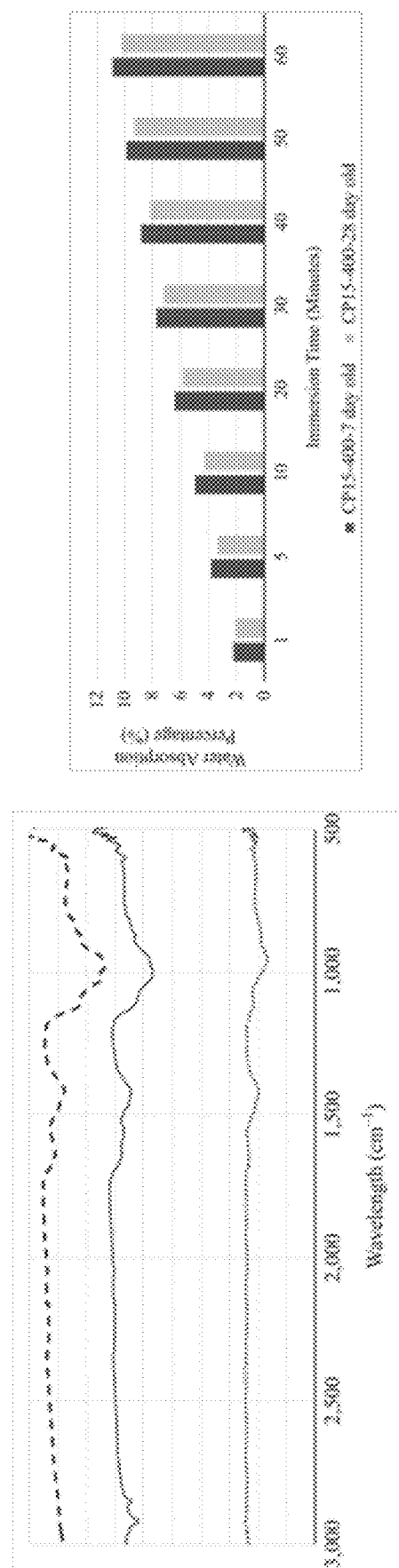
FIG. 17 is a composite figure of FTIR spectra for CP0.00-NO SB (dotted line), CP15-400 (solid line) and CP15-600 (dashed line).
FIG. 18 is a bar graph of water absorption percentage as a function of immersion time (in minutes) of CP15-400 7 days old (dark bars) and CP15-400 28 days old (light bars).

Results shown in FIG. 16 were in agreement with the FTIR analysis in FIG. 17 which revealed that the main difference between the WAPs of the LTT-SB pastes and the HTT-SB pastes was attributable to the presence of hydrophobic alkyl groups (C—H at 2,858 $cm^{-1}$ and 2,927 $cm^{-1}$) in LTT-SB pastes (CP15-400). The C—H peaks were dominant in LTT-SB cement pastes because there were still unburned organic matter in LTT-SBs. LOI results from Table 6 confirmed that the hydrophobic surface functional groups originated from volatile matter that were more dominant in LTT-SBs, compared to HTT-SBs. The long chains of these non-polar hydrophobic alkyl groups were responsible for the water repulsion and the negative capillary pressure in the LTT-SB cement paste pores and contributed to the reduction in their WAPs. FIG. 17 shows that no C—H peaks (2,848 $cm^{-1}$, 2,917 $cm^{-1}$) for alkyl groups were detected in CP15-600 and CP0.00-NO SB. These alkyl groups are noticeably absent in CP0.00-NO SB because it had no SB and as such no organic matter. Furthermore, the presence of these alkyl groups in LTT-SBs contributed to the higher LOIs, and the lower surface areas and pore volumes of LTT-SBs (Table 5). These properties minimized SB surfaces available for sorption. Therefore, textural properties also contributed to the differences between the WAPs obtained for LTT-SB cement pastes and HTT-SB cement pastes.

Contrary to LTT-SB cement pastes, HTT-SB pastes (CP15-600, CP15-800) had WAPs similar to the control paste. Notably, no statistically significant differences (p<0.05) existed among control pastes (CP0.00-NO SB), CP15-600, and CP15-800. From FIG. 16, CP15-600 and CP15-800 pastes conspicuously absorbed more water. This could be attributed to the fact that at HTTs, there is significant decarbonation/devolatilization of the amorphous hydrophobic alkyl chains leaving behind mostly crystalline and aromatic Sp2 hybridized carbon moieties which are relatively more hydrophilic in nature. Additionally, at HTTs, the WAPs increased due to the relative increase in the amount of mineral oxides/salts which are polar/ionic and further facilitate the absorption of water.

CP15-600 had the highest WAPs because coupled with the lack of hydrophobic alkyl groups, CP15-600 was modified with SB600, which had the highest surface areas and pore volumes (Table 5). However, compared to CP15-600, CP15-800 had a slightly lower WAP because it had slightly lower surface areas and pore volumes (Table 5). Considering its low LOI and high mineral content, this was attributed to the high ash content in SB800 which had degraded the pores and as such resulted in a slight reduction of its surface areas and pore volumes.

Table 7 shows that the control cement and pastes had higher DBDs and ODDs when compared to SB modified binders and their respective pastes. The lower bulk densities of SB modified powders and their associated pastes were as a result of the lower dry densities of the SBs (Table 5) that were used to partially replace cement in the SB modified pastes.

TABLE 7

Densities of SB modified cements and hardened cement pastes

| Mix design | CP0.00-NO SB | CP15-340 | CP15-400 | CP15-600 | CP15-800 |
|---|---|---|---|---|---|
| Dry bulk density of dry binders (g/cm³) | 1 | 0.75 | 0.69 | 0.68 | 0.71 |
| Oven dry density of hardened cement pastes (g/cm³) | 1.64 | 1.57 | 1.4 | 1.57 | 1.59 |

Despite the higher densities associated with control pastes, they had higher WAPs. This provided a strong indication that the lower WAPs observed in LTT-SB modified cement pastes were not associated with their lower oven dry densities, but rather mostly resulted from the hydrophobic behavior of the surface functional groups of LTT-SBs.

Effect of Aging on Water Absorption

FIG. 18 shows that WAPs for seven-day specimens were higher than those of 28-day pastes indicating that resistance to water penetration improved with age. Although not statistically significant, the WAP for the seven-day old specimen was 8.34% higher than that of the 28-day old pastes. This can be attributed to the fact that with the longer hydration period, there was a more complete development of the hydrated products and this reduced the capillary pores and therefore lowered the suction of water into the cement pastes. This reduced the water absorbed and lowered the WAP for the older samples, which were the 28-day old CP15-400.

In summary, SB treatment temperatures modified SB chemical composition and textural properties. Notably, LTT increased hydrophobicity of SB, while higher temperature treatments increased hydrophilicity. Consequently, the changes in the physical and chemical properties of SB exhibited a profound effect on the WAPs of SB modified cement pastes. By homogeneously mixing water with the dry cement/SB binder, SB was dispersed within the cement paste matrix. As hydration progressed and capillary water was consumed, key hydration products grew into the pore space that was originally occupied by water. The cement paste then set and developed strength; however, with capillary porosity within the cement paste matrix. The presence of hydrophobic alkyl functional groups from LTT-SB altered surface chemistry of the capillary pores within the hardened LTT-SB modified cement paste. Considering that these pores provided the primary transport routes in and out of the cement paste, changes in the surface chemistry of the pores reduced capillary water absorption; improving the durability of the cement pastes disclosed herein.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A cementitious composition comprising swine waste biochar and cement, wherein the swine waste biochar comprises about 40%-60% carbon, about 25% 45% oxygen, about 2% 11° A phosphorus and about 2%-10% calcium.

2. The cementitious composition of claim 1, wherein swine waste biochar comprises between about 0.25% and about 30% by weight of the composition.

3. The cementitious composition of claim 2, wherein said swine waste biochar comprises between about 1% and about 15% by weight of the composition.

4. The cementitious composition of claim 1, wherein said swine waste biochar comprises about 50-60% carbon and about 25%-35% oxygen.

5. The cementitious composition of claim 1, wherein said swine waste biochar comprises about 55% carbon, about 30% oxygen, about 5% phosphorus and about 5% calcium.

6. A composition comprising about 1 part by weight cementitious materials, about 1 to about 3 parts by weight fine aggregate, about 1 to about 5 parts by weight coarse aggregate, and about 0.2 to about 0.6 parts by weight water, wherein the cementitious materials comprise about 0.25% to about 30% by weight swine waste biochar and about 99.75% to about 70% by weight cement, wherein the swine waste biochar comprises about 40%-60% carbon, about 25%-45% oxygen, about 2%-11% phosphorus and about 2%-10% calcium.

7. The composition of claim 6, wherein the fine aggregate is sand and the coarse aggregate is stone.

8. The composition of claim 6, wherein said swine waste biochar comprises about 50-60% carbon and about 25%-35% oxygen.

9. The composition of claim 6, wherein said swine waste biochar comprises about 55% carbon, about 30% oxygen, about 5% phosphorus and about 5% calcium.

10. The composition of claim 6, wherein the cementitious materials comprise about 1% to about 15% by weight swine waste biochar and about 99% to about 85% by weight cement.

11. The composition of claim 10, wherein the fine aggregate is sand and the coarse aggregate is stone.

12. The composition of claim 10, wherein said swine waste biochar comprises about 50-60% carbon and about 25%-35% oxygen.

13. The composition of claim 10, wherein said swine waste biochar comprises about 55% carbon, about 30% oxygen, about 5% phosphorus and about 5% calcium.

14. A method of accelerating the setting of a cement paste comprising combining cement with swine waste biochar to obtain a blended mix before the addition of water.

15. The method of claim 14, wherein said cement paste has a shorter initial time of setting and/or a shorter final time of setting compared to cement paste that does not contain swine waste biochar.

16. The method of claim 14, wherein said set cement paste has reduced water absorption compared to cement paste that does not contain swine waste biochar.

17. The method of claim 16, wherein said water absorption is reduced by at least about 60% compared to water absorption of cement paste that does not contain swine waste biochar.

* * * * *